United States Patent
MacLeod et al.

(10) Patent No.: US 10,282,988 B2
(45) Date of Patent: May 7, 2019

(54) METHODS OF PROVIDING ADVERTISEMENTS IN TRAFFIC CHANNELS AND SUPPORTING APPARATUS, READABLE MEDIUM, AND DATA STRUCTURE

(75) Inventors: John MacLeod, Winnetka, IL (US); Lumumba Mbekeani, Oak Park, IL (US); Howard R. Hayes, Jr., Glencoe, IL (US)

(73) Assignee: HERE Global B.V., Eindhoven (NL)

( * ) Notice: Subject to any disclaimer, the term of this patent is extended or adjusted under 35 U.S.C. 154(b) by 2691 days.

(21) Appl. No.: 11/416,767

(22) Filed: May 2, 2006

(65) Prior Publication Data

US 2007/0259634 A1    Nov. 8, 2007

(51) Int. Cl.
| | | |
|---|---|---|
| *G06Q 30/00* | (2012.01) | |
| *G08G 1/0967* | (2006.01) | |
| *G06Q 30/02* | (2012.01) | |
| *H04H 60/53* | (2008.01) | |
| *H04H 20/40* | (2008.01) | |
| *H04H 20/55* | (2008.01) | |

(52) U.S. Cl.
CPC ... *G08G 1/096716* (2013.01); *G06Q 30/0246* (2013.01); *G06Q 30/0252* (2013.01); *G06Q 30/0261* (2013.01); *G06Q 30/0265* (2013.01); *G06Q 30/0266* (2013.01); *G08G 1/096741* (2013.01); *G08G 1/096775* (2013.01); *H04H 60/53* (2013.01); *G06Q 30/0251* (2013.01); *H04H 20/40* (2013.01); *H04H 20/55* (2013.01); *H04H 2201/13* (2013.01)

(58) Field of Classification Search
CPC ........... G06Q 30/0261; G06Q 30/0265; G06Q 30/0251; G06Q 30/0246; G06Q 30/0266; G06Q 30/0252
USPC ......... 705/14.58, 14.62, 14.49, 14.45, 14.63, 705/14.5
See application file for complete search history.

(56) References Cited

U.S. PATENT DOCUMENTS

| | | | | |
|---|---|---|---|---|
| 5,664,948 A | * | 9/1997 | Dimitriadis et al. | ..... 434/307 R |
| 5,748,107 A | | 5/1998 | Kersken et al. | ............. 340/905 |

(Continued)

FOREIGN PATENT DOCUMENTS

| | | | | |
|---|---|---|---|---|
| DE | 102010021663 | * | 1/2011 | |
| EP | 1004852 | | 5/2000 | ............. G01C 21/34 |

(Continued)

OTHER PUBLICATIONS

Corresponding European Search report, dated Feb. 9, 2009 (7 pages).

(Continued)

*Primary Examiner* — Raquel Alvarez
(74) *Attorney, Agent, or Firm* — Alston & Bird LLP

(57) ABSTRACT

A technique of providing advertisements in a traffic message is provided that obtains (704) traffic data having a traffic condition of a location description on a road network. A location reference code associated with the location description assigned by a traffic message supplier and an advertising reference code associated with the location reference code are assessed (706), (714), followed by a determination (716) as to whether the advertising reference code is present. If so, a traffic message having the location reference code and the advertising reference code is generated (710).

28 Claims, 13 Drawing Sheets

(56) References Cited

U.S. PATENT DOCUMENTS

| | | | |
|---|---|---|---|
| 6,112,064 A * | 8/2000 | Arrowsmith et al. | 455/186.1 |
| 6,374,177 B1 * | 4/2002 | Lee et al. | 701/200 |
| 6,438,561 B1 | 8/2002 | Israni et al. | 707/104.1 |
| 6,542,814 B2 | 4/2003 | Polidi et al. | 701/208 |
| 6,567,658 B1 | 5/2003 | Van De Graaf | 455/412 |
| 6,587,782 B1 | 7/2003 | Nocek et al. | 701/200 |
| 6,654,800 B1 | 11/2003 | Rieger, III | 709/223 |
| 7,089,264 B1 | 8/2006 | Guido et al. | 707/104.1 |
| 7,136,915 B2 | 11/2006 | Rieger, III | 709/223 |
| 7,660,666 B2 | 2/2010 | Finn et al. | |
| 2002/0013656 A1 | 1/2002 | Namba | 701/200 |
| 2002/0021674 A1 | 2/2002 | Thorne et al. | 370/252 |
| 2002/0049527 A1 * | 4/2002 | Kohno et al. | 701/117 |
| 2002/0091568 A1 * | 7/2002 | Kraft et al. | 705/14 |
| 2002/0165773 A1 * | 11/2002 | Natsuno et al. | 705/14 |
| 2004/0073355 A1 | 4/2004 | Yates | 701/117 |
| 2004/0225433 A1 * | 11/2004 | Burt | 701/200 |
| 2005/0148325 A1 | 7/2005 | Kopra et al. | 455/420 |
| 2005/0266814 A1 | 12/2005 | Steelberg et al. | 455/186.1 |
| 2006/0031012 A1 | 2/2006 | Okamoto | 701/213 |
| 2006/0075425 A1 | 4/2006 | Koch et al. | 725/32 |
| 2007/0174490 A1 * | 7/2007 | Choi | G06F 8/70 709/246 |
| 2007/0238427 A1 * | 10/2007 | Kraft et al. | 455/184.1 |
| 2007/0266191 A1 * | 11/2007 | Schnepp et al. | 710/264 |
| 2010/0036728 A1 * | 2/2010 | Pechenick et al. | 705/14.48 |
| 2013/0054315 A1 * | 2/2013 | Shutter | G06Q 30/02 705/14.1 |
| 2014/0344061 A1 * | 11/2014 | Choi | G06Q 30/0267 705/14.64 |
| 2015/0146682 A1 * | 5/2015 | Lin | H04W 24/04 370/331 |
| 2015/0326680 A1 * | 11/2015 | Farahani | H04W 4/029 706/12 |
| 2016/0284215 A1 * | 9/2016 | Ova | G08G 1/0967 |
| 2018/0027423 A1 * | 1/2018 | Greenberger | H04W 16/22 455/446 |
| 2018/0075481 A1 * | 3/2018 | Adoni | G06F 16/285 |

FOREIGN PATENT DOCUMENTS

| | | | |
|---|---|---|---|
| JP | 10224291 | 8/1998 | H04B 7/26 |
| JP | H1165434 | 3/1999 | |
| JP | 2002074585 | 3/2002 | |
| JP | 2002-213976 | 7/2002 | |
| JP | 2005-323051 A | 11/2005 | |
| WO | WO 96/11436 | 4/1996 | G06F 7/04 |
| WO | WO 2005/106823 A1 | 11/2005 | |

OTHER PUBLICATIONS

Japanese Office Action, from related Japanese Application No. 2007-146128, Mar. 22, 2013, JP.

Japan Patent Office, Office Action for Application No. 2007-146128, dated Apr. 10, 2012, 12 pages, Japan.

* cited by examiner

METHODS OF PROVIDING ADVERTISEMENTS IN TRAFFIC CHANNELS AND SUPPORTING APPARATUS, READABLE MEDIUM, AND DATA STRUCTURE

BACKGROUND

The present invention relates generally to a technique of providing advertisements, and more particularly to a technique of providing advertisements in traffic channels.

In some metropolitan areas and countries, systems have been implemented that broadcast data messages that contain up-to-the-minute reports of traffic and road condition information. These systems broadcast the data messages on a continuous, periodic, or frequently occurring basis. Receivers decode the data messages and provide the up-to-the-minute reports of traffic and road information.

The traffic data message broadcast systems have several advantages over radio stations simply broadcasting audio traffic reports. For example, with the traffic data message broadcasting systems, a driver can obtain the traffic information quickly. The driver does not have to wait until the radio station broadcasts a traffic report. Another advantage of the traffic data message broadcast systems is that the driver does not have to listen to descriptions of traffic conditions for areas remote from his or her location. Another advantage of traffic data message broadcast systems is that more detailed and possibly more up-to-date information can be provided. In these types of systems, the data messages conform to one or more pre-established specifications or formats. The in-vehicle receivers decode the traffic data messages using the pre-established specifications or formats.

One system for broadcasting traffic and road condition information is the Radio Data System-Traffic Message Channel ("RDS-TMC") (or RBDS in North America). The RDS-TMC system is used in North America and some European countries. RDS-TMC messages are broadcast regularly or at varying intervals. Another traffic system named Vehicle Information and Communication System ("VICS") Center is also used in Japan.

Using these various traffic systems, it may be helpful to provide other information that may or may not be related to traffic information. But the integration of these other information is complicated by the existing protocols of the ALERT-C message and the bandwidth limitation of the RDS-TMC. The current traffic systems, thus, can be improved to efficiently and effectively provide other information using the traffic message channel systems.

SUMMARY OF THE INVENTION

To address these and other objectives, the present invention provides, according to one embodiment, a method of providing advertisements in a traffic message that obtains traffic data having a traffic condition of a location description on a road network, followed by an assessment of a location reference code associated with the location description assigned by a traffic message supplier and an advertising reference code associated with the location reference code. A determination is then made as to whether the advertising reference code is present, and if so, a traffic message having the location reference code and the advertising reference code is generated.

According to another embodiment, a method of providing advertisement messages using location reference codes is provided that assesses a location reference code of a location description and an advertising reference code associated with the location reference code. A determination is made as to whether the advertising reference code is present, and if so, an advertising message having the advertising reference code is generated and provided for broadcast to navigation systems.

In one embodiment, a method of providing advertisements using location reference codes is provided that after receipt of a message from a traffic supplier, a location reference code and an advertising reference code are assessed from the message. A determination is made as to whether the advertising reference code is present, and if so, at least one advertisement associated with the advertising reference code is assessed and provided for output on navigation systems.

According to an embodiment, an apparatus of providing advertisements using location reference codes is provided, which includes a memory having a message with a location reference code and an advertising reference code, an advertising provider coupled to the memory that assesses at least one advertisement associated with the advertising reference code, and a user interface coupled to the advertising provider that provides the one or more advertisements associated with the advertising reference code for output on navigation systems.

The data structure of the traffic message, according to one embodiment, is provided. The data structure includes a first field having a location reference code associated with a location description on a road segment assigned by a traffic message supplier and a second field having an advertising reference code associated with the location reference of the first field, wherein the advertising reference code is associated with at least one advertisement for output on navigation systems.

Through the embodiments of various teachings, an advertising technique using the traffic services have been provided that, among other things, seamlessly integrates into the existing traffic service systems. Moreover, advertisements can be customized according to geographical area using the location reference code of the traffic message. Since an advertising reference code is provided, minimal data transmission is needed, reducing the bandwidth needed for transmission. Periodic user subscription fees may be reduced or eliminated by collecting revenue from advertisers who pay for advertising space and time.

BRIEF DESCRIPTION OF THE DRAWINGS

The accompanying figures, where like reference numerals refer to identical or functionally similar elements throughout the separate views and which together with the detailed description below are incorporated in and from part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

As required, detailed embodiments of the present invention are disclosed herein. It is to be understood, however, that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure. Further, the terms and phrases used herein are not intended to be limiting, but rather to provide an understandable description of the invention.

Furthermore, the terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," "firmware," "circuit," the like as used herein, are defined as a sequence of instructions designed for execution on a computer system. A program, computer program, software application, firmware, or circuit may include a subroutine, a function, a procedure, an object method, an object implementation, an executable application, an applet, a servlet, a source code, an object code, a shared library/dynamic load library and/or other sequence of instructions designed for execution on a computer system. Moreover, the term "assess" is used to broadly describe the multiple exemplary computer functions of, but not limited to, obtaining, accessing, extrapolating, collecting, calculating, computing, detecting, evaluating, determining, and/or searching. Another term "provide" is also used to broadly describe the multiple exemplary computer functions of, but again not limited to, displaying, outputting, and transmitting.

I. Geographic Map Database

A. Geographic Database

Figure 1:
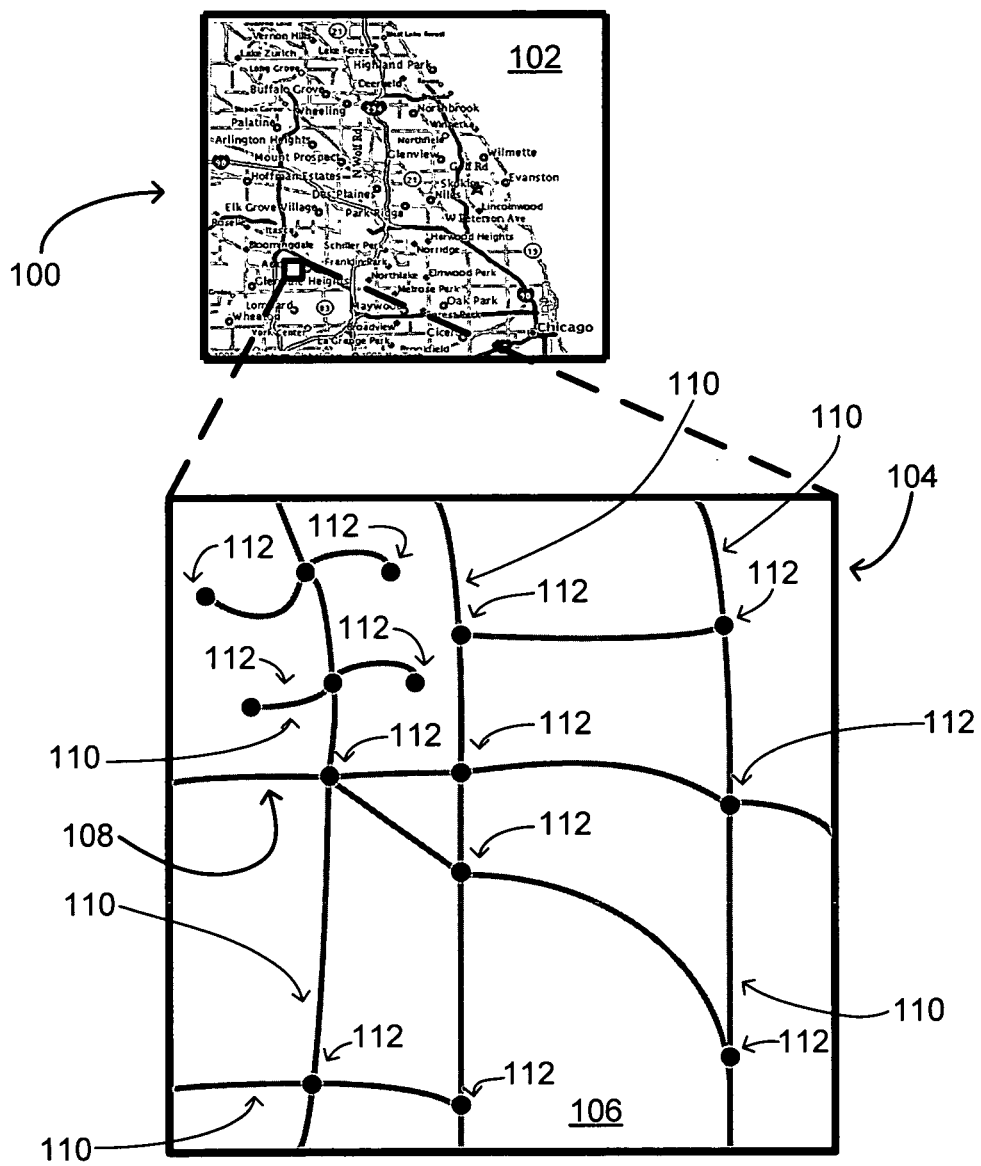
FIG. 1 shows a map of the geographic region shown in FIG. 1.

FIG. 1 illustrates a map 100 of a geographic region 102. The geographic region 102 may correspond to a metropolitan or rural area, a state, a country, or combinations thereof, or any other area. Located in the geographic region 102 are physical geographic features, such as roads, points of interest (including businesses, municipal facilities, etc.), lakes, rivers, railroads, municipalities, etc.

FIG. 1 also includes an enlarged map 104 of a portion 106 of the geographic region 102. The enlarged map 104 illustrates part of a road network 108 in the geographic region 102. The road network 108 includes, among other things, roads and intersections located in the geographic region 102. As shown in the portion 106, each road in the geographic region 102 is composed of one or more road segments 110. A road segment 110 represents a portion of the road. Each road segment 110 is shown to have associated with it two nodes 112; one node represents the point at one end of the road segment and the other node represents the point at the other end of the road segment. The node 112 at either end of a road segment 110 may correspond to a location at which the road meets another road, i.e., an intersection, or where the road dead-ends.

Figure 2:
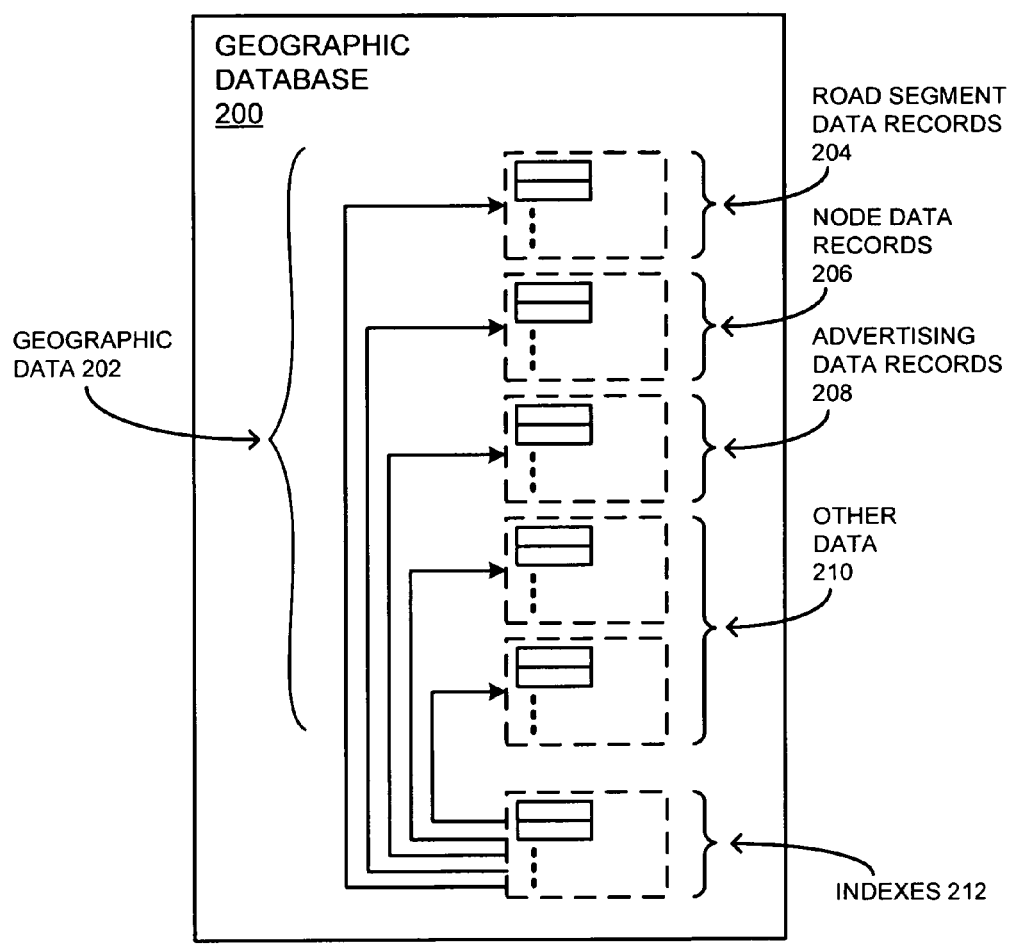
FIG. 2 is a block diagram of a geographic database, according to various embodiments.

Referring to FIG. 2, the geographic database 200 contains data 202 that represents some of the physical geographic features in the geographic region 102 depicted in FIG. 1. The data 202 contained in the geographic database 200 includes data that represent the road network 108. In the embodiment of FIG. 2, the geographic database 200 that represents the geographic region 102 contains at least one road segment database record 204 (also referred to as "entity" or "entry") for each road segment 110 in the geographic region 102. The geographic database 200 that represents the geographic region 102 also includes a node database record 206 (or "entity" or "entry") for each node 112 in the geographic region 102. The terms "nodes" and "segments" represent only one terminology for describing these physical geographic features, and other terminology for describing these features is intended to be encompassed within the scope of these concepts.

The geographic database 200 includes advertising data records 208, which represent the various advertising information located in the geographic region 102. For example, the advertising data records 208 may include data representing advertisements as audio outputs, video outputs, icon outputs, and text outputs on a navigation system. The geographic database 200 may also include other kinds of data 210, which may represent other kinds of geographic features or anything else. The geographic database 200 also includes indexes 212. The indexes 212 may include various types of indexes that relate to different types of data to each other or that relate to other aspects of the data contained in the geographic database 200. For example, the indexes 212 may relate the nodes in the node data records 206 with the end points of a road segment in the road segment data records 204.

B. Road Segment Data Record

Figure 3:
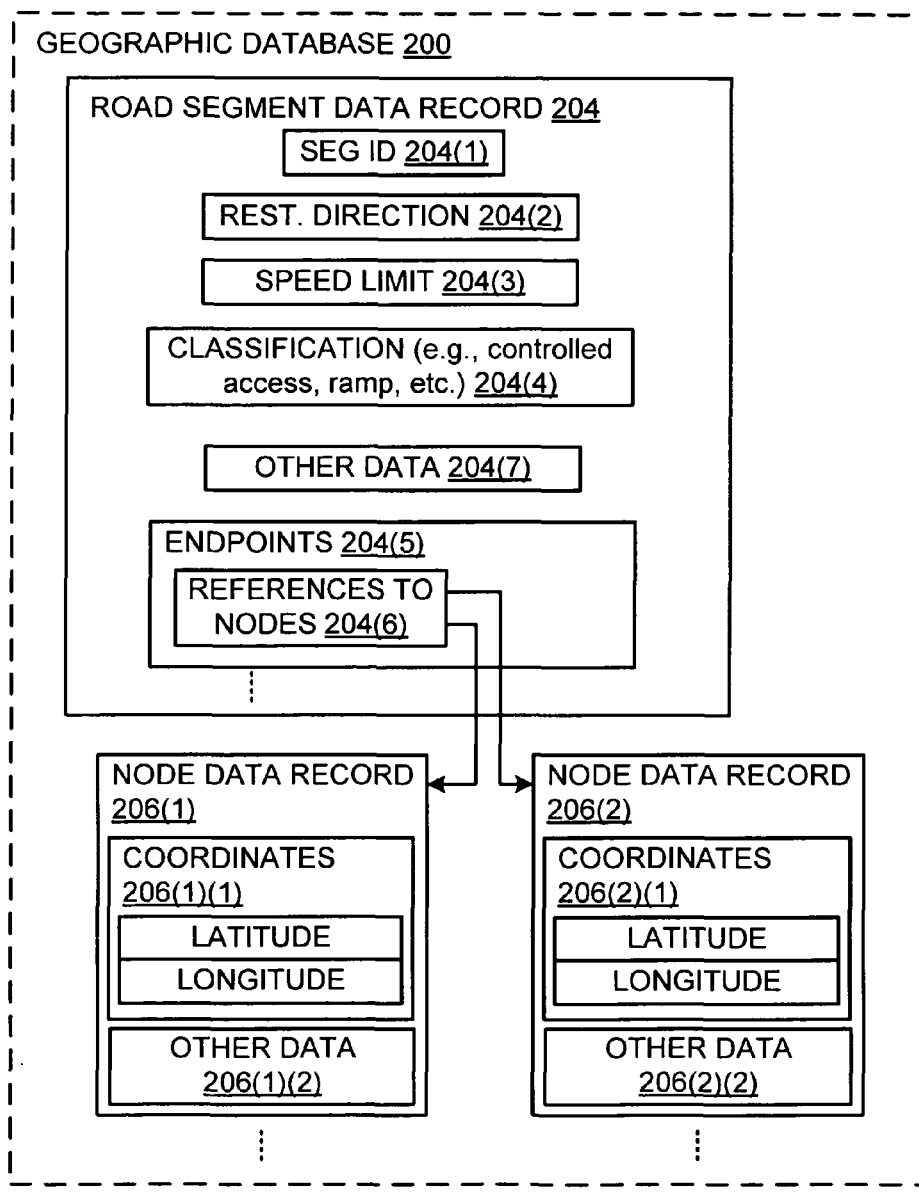
FIG. 3 is a block diagram of components of data records contained in the geographic database depicted in FIG. 2, according to various embodiments.

FIG. 3 shows some of the components of a road segment data record 204 contained in the geographic database 200. The road segment data record 204 includes a segment identification ("ID") 204(1) by which the data record can be identified in the geographic database 200. Each road segment data record 204 has associated with it information (such as "attributes", "fields", etc.) that describes features of the represented road segment. The road segment data record 204 may include data 204(2) that indicate the restrictions, if any, on the direction of vehicular travel permitted on the represented road segment. The road segment data record 204 includes data 204(3) that indicate a speed limit or speed category (i.e., the maximum permitted vehicular speed of travel) on the represented road segment. The road segment data record 204 may also include data 204(4) indicating whether the represented road segment is part of a controlled access road (such as an expressway), a ramp to a controlled access road, a bridge, a tunnel, a toll road, a ferry, and so on.

The road segment data record 204 also includes data 204(5) providing the geographic coordinates (e.g., the latitude and longitude) of the end points of the represented road segment. In one embodiment, the data 204(5) are references 204(6) to the node data records 206 that represent the nodes corresponding to the end points of the represented road segment. The road segment data record 204 may also include or be associated with other data 204(7) that refer to various other attributes of the represented road segment. The various attributes associated with a road segment may be included in a single road segment record, or may be included in more than one type of record which cross-references to each other. For example, the road segment data record 204 may include data identifying what turn restrictions exist at each of the nodes which correspond to intersections at the ends of the road portion represented by the road segment, the name or names by which the represented road segment is known, the street address ranges along the represented road segment, and so on.

FIG. 3 also shows some of the components of a node data record 206 contained in the geographic database 200. Each of the node data records 206 may have associated information (such as "attributes", "fields", etc.) that allows identification of the road segment(s) that connect to it and/or it's geographic position (e.g., its latitude and longitude coordinates). For the embodiment shown in FIG. 3, the node data records 206(1) and 206(2) include the latitude and longitude coordinates 206(1)(1) and 206(2)(1) for their node. The node data records 206(1) and 206(2) may also include other data 206(1)(2) and 206(2)(2) that refer to various other attributes of the nodes.

C. Advertising Data Record

Figure 4:
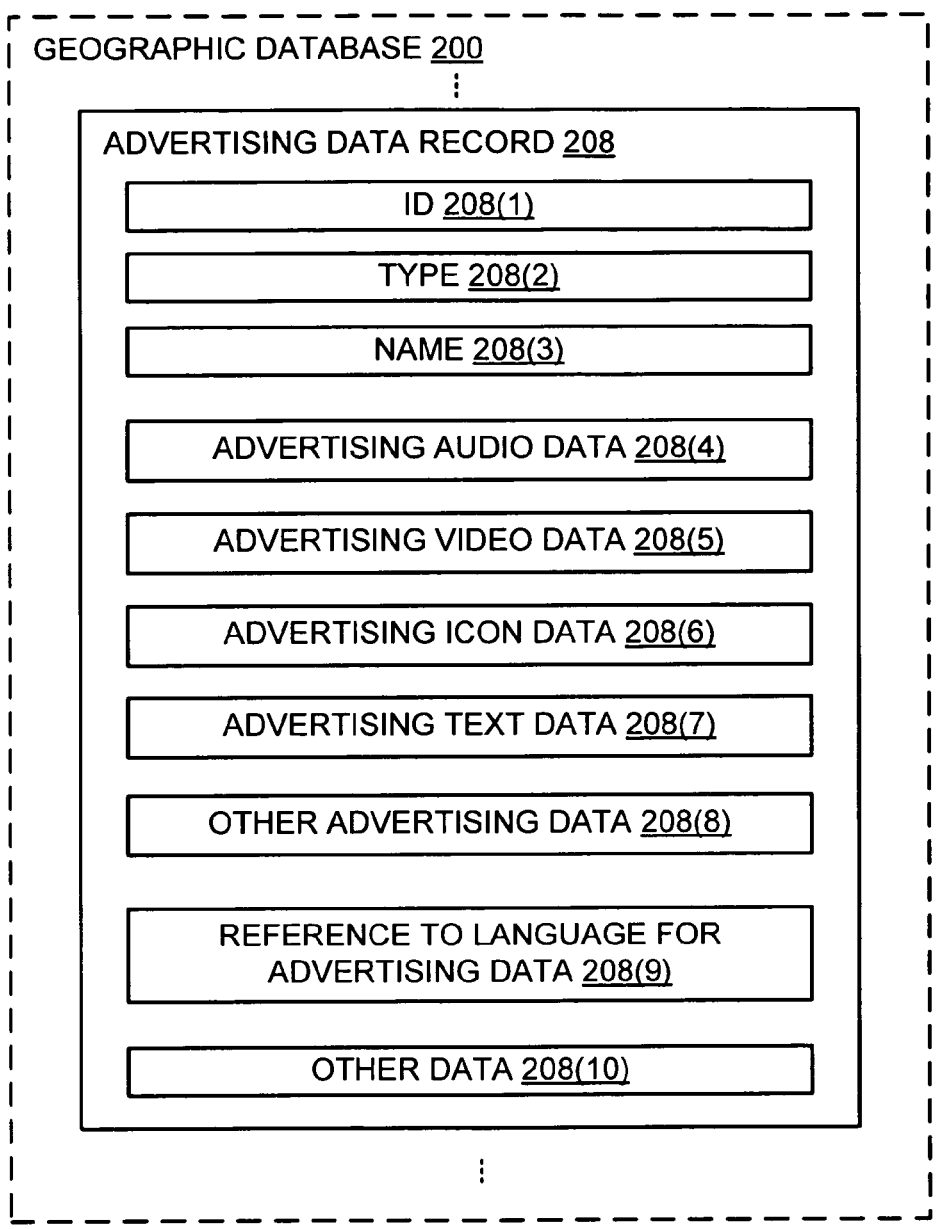
FIG. 4 is a block diagram of advertising data records contained in the geographic database depicted in FIG. 2, according to various embodiments.

FIG. 4 shows some components of an advertising data record 208 contained in geographic database 200. The advertising data record 208 represents the various advertisements located in the geographic region 102. According to one embodiment, the advertisements are organized according to specific location of the geographic region to provide advertisements customized to the real-time experience and location of the user. With this embodiment, advertisements can optionally be customized according to points of interest of the specific location in the geographic region. Other embodiments of the advertisements not being linked to any specific locations are also contemplated. For example, the proper advertising data record 208 is obtained through the use a substantially unique identification.

In this embodiment shown, the advertising data record 208 includes an advertising identification ("ID") 208(1) by which the data record can be identified in the geographic database 200. Advertising data record 208 also includes data features that relates to the represented advertisements. For example, one or more advertising data records may include a type 208(2) (e.g., local, state, national, or regional advertisements). The advertising data record 208 further include a name (208)(3) to identify the advertisements. Since multiple types of advertisements are contemplated, the advertising data record 208 may include advertising data that represent audio data 208(4), video data 208(5), icon data 208(6), text data 208(7), and/or any other advertising data 208(8).

According to one specific embodiment, reference to language for the advertising data 208(9) can also be included to provide the advertisements in various languages based either on location of the vehicle and/or the end user configuration. The advertising data record 208 also includes a field for any other data 208(10) to be included. Because various specific implementations are readily available to a skilled artisan, these various embodiments of the advertising data record, although may not be specifically shown, are within the scope of the embodiments provided.

II. Traffic Information Broadcast System-Overview

Figure 5:
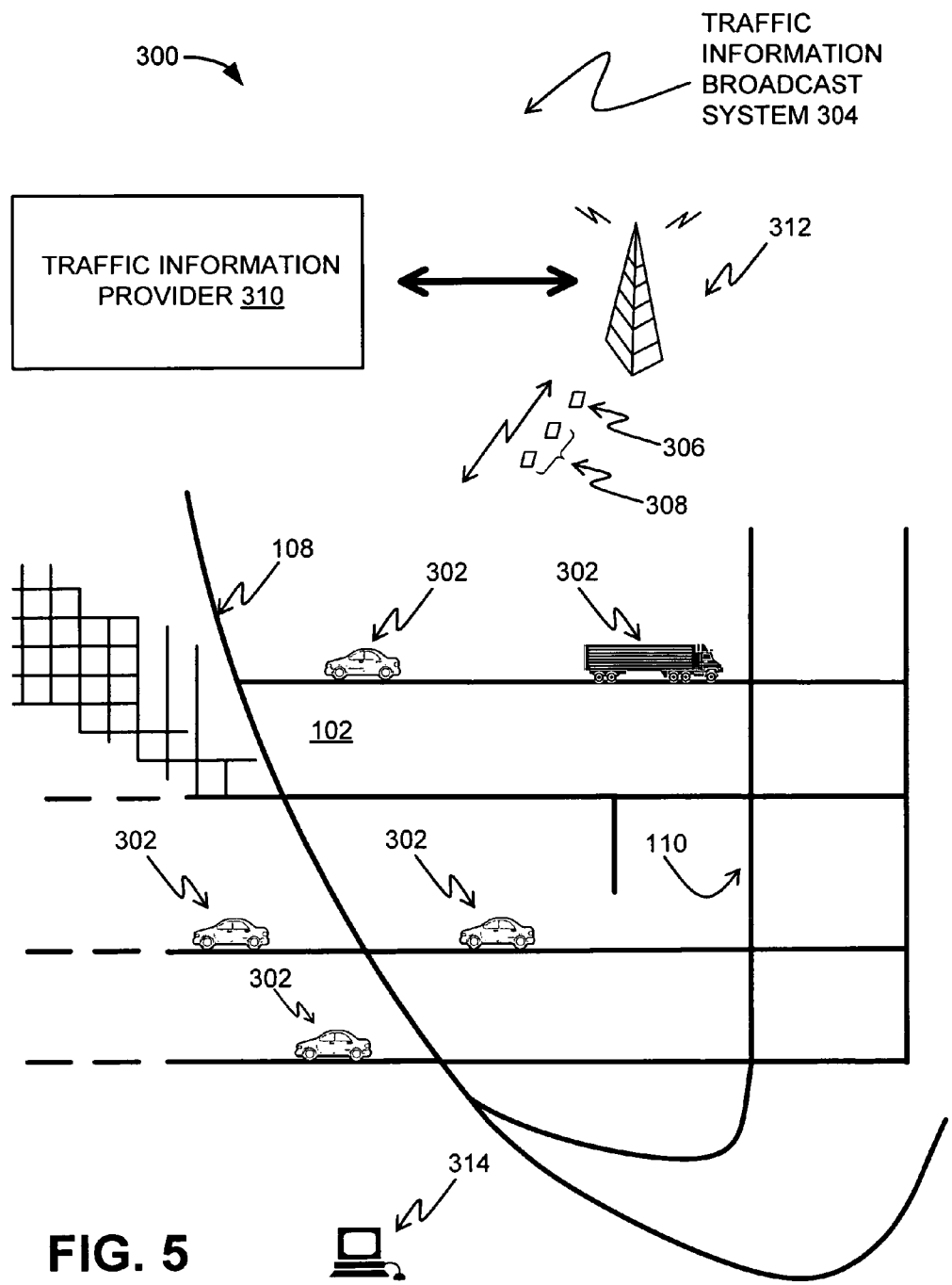
FIG. 5 is a diagram illustrating components of a traffic broadcast system in a geographic region.

FIG. 5, for purposes of providing an illustrative but non-exhaustive example to facilitate this description, a specific operational paradigm using a navigation system is shown and indicated generally at 300. Those skilled in the art, however, will recognize and appreciate that the specifics of this illustrative example are not specifics of the invention itself and that the teachings set forth herein are applicable in a variety of alternative settings. These various platforms and communication implementations are, as a result, within the scope of the invention, and various embodiments for these multiple implementations are readily understood and appreciated by one skilled in the art. Moreover, although traffic information broadcast is used as a practical embodiment, the various embodiments contemplates other non-traffic broadcast systems, such as parking spot availability or gas price data.

Referring now to the exemplary navigation network shown in FIG. 5, a diagram illustrating the geographic region 100 is shown. The geographic region 102 includes the road network 108 comprising numerous road segments 110 on which numerous vehicles 302 travel. The vehicles 302 may include cars, trucks, buses, bicycles, motorcycles, etc. The geographic region 102 may be a metropolitan area, such as the New York metropolitan area, the Chicago metropolitan area, or any other metropolitan area. Alternatively, the geographic region 102 may be a state, province, or country, such as California, Illinois, France, England, or Germany. Alternatively, the geographic region 102 can be a combination of one or more metropolitan areas, states, countries and so on.

A traffic information broadcast system 304 broadcasts traffic messages 306 (one shown) regarding the traffic and road conditions on the road network 108 and advertising messages 308 (two shown) associated with location description of the road network in the geographic region 102. A traffic information provider 310 operates the traffic information broadcast system 304. Some or all of the vehicles 302 include suitable equipment that enables them to receive the traffic messages 306 and the advertising messages 308 broadcasted by the traffic information broadcast system 304, via a transmission equipment 312. The traffic messages 306 and the advertising messages 308 may also be received and used in systems that are not installed in vehicles (e.g., "non-vehicles 314"). These non-vehicles 314 may include workstations, personal computers, personal digital assistants, networks, pagers, televisions, radio receivers, telephones, and so on. The non-vehicles 314 that receive the traffic messages 306 and the advertising messages 308 may obtain them in the same manner as the vehicles, i.e., by broadcast. Alternatively, the non-vehicles 314 may receive the traffic messages 306 and advertising messages 308 by other means, such as over telephone lines, over the Internet, via cable, and so on. The systems in the vehicles 302 or in the non-vehicles 314 that receive the traffic messages 306 and the advertising messages 308 may include various different platforms as known to those skilled in the art. The various teachings also contemplate one-to-one communications, such as a cellular system. Thus, the term "broadcast" intends to cover both one-to-many communications and one-to-one communications.

Figure 6:
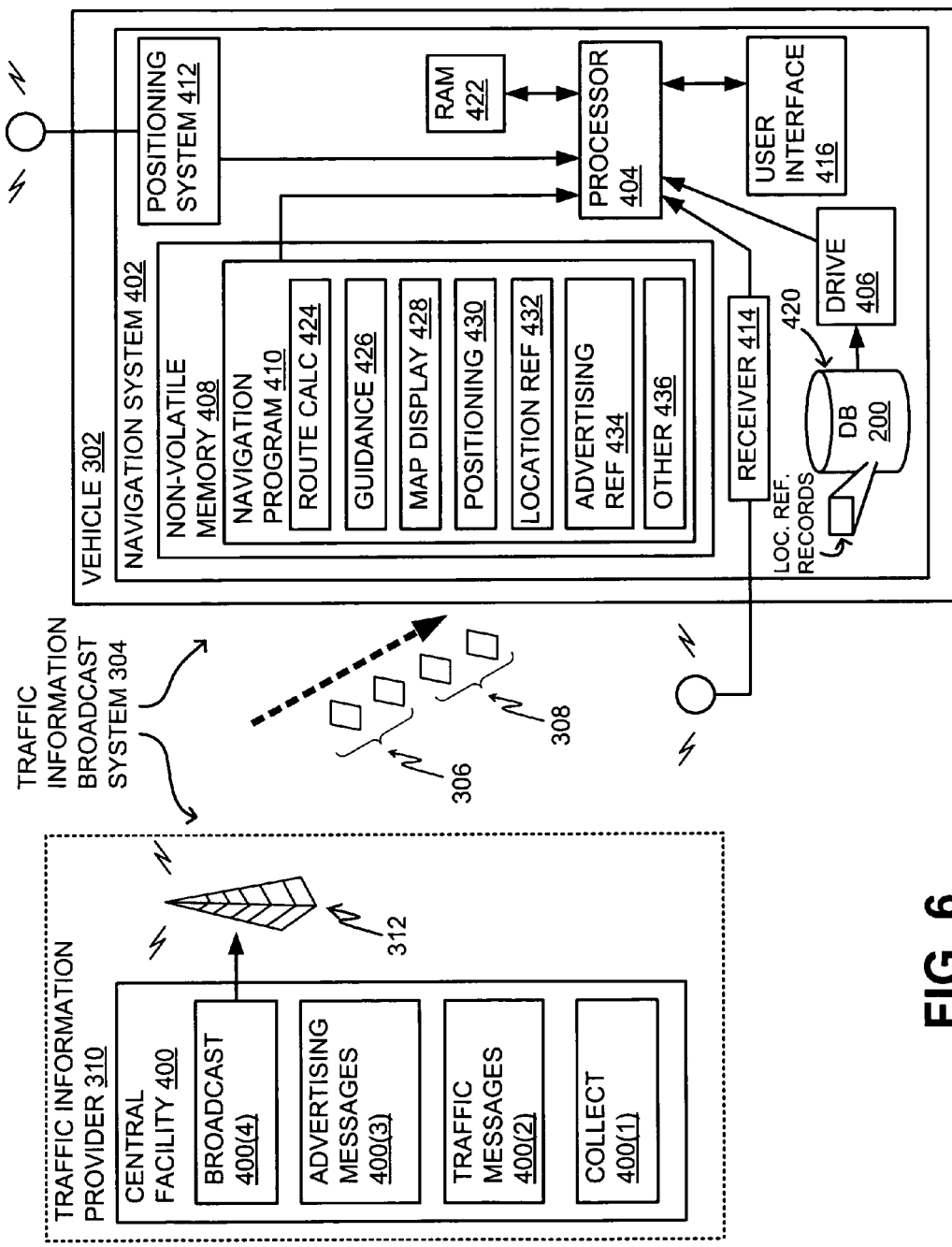
FIG. 6 is a block diagram illustrating components of the traffic broadcast system and one of the vehicles with an on-board navigation system, as shown in FIG. 5.

FIG. 6 shows diagrammatically the components of the traffic information broadcast system 304 and one of the vehicles 302 in FIG. 5. The traffic information broadcast system 304 provides for collecting of data relating to traffic and road conditions, developing traffic messages from the collected data, and transmitting the traffic messages 306 to the vehicles 302 and non-vehicles 314 in the region 102 on a regular and continuing basis.

The traffic information broadcast system 304 includes a central facility 400 operated by the traffic information provider 310. The central facility 400 includes equipment and programming 400(1) for collecting the data relating to traffic and road conditions in the region 102 from various sources or manual input. The central facility 400 also includes equipment and programming 400(2) for developing the traffic messages 306 from the collected traffic and road condition data. Additionally, the central facility 400 also includes equipment and programming 400(3) for developing the advertising messages 308 associated with location descriptions of the region 102. Although separately shown, the advertising messages 308 can be separately broadcasted and/or integrated partially or completely into the traffic messages 306, depending upon the various implementations. Accordingly, the central facility 400 includes suitable equipment and programming 400(4) for broadcasting the traffic messages 306 and the advertising messages 308.

To broadcast the traffic messages 306, the traffic information broadcast system 304 broadcasts the traffic messages 306 and advertising messages 308 using the transmission equipment 312. The transmission equipment 312 may comprise one or more FM transmitters, including antennas, or other wireless transmitters. The transmission equipment 312 provides for broadcasting the traffic messages 306 and the advertising messages 308 throughout the region 102. The transmission equipment 312 may be part of the traffic information broadcast system 304, or alternatively, the transmission equipment 312 may use equipment from other types of systems, such as cellular or paging systems, satellite radio, FM radio stations, and so on, to broadcast traffic messages 306 to the vehicles 302 and non-vehicles 314 in the region. In one embodiment, the central facility 400 transmits the traffic messages 306 and the advertising messages 308 to a broadcaster that broadcasts the messages. (For purposes of this disclosure and the appended claims, the broadcasting of traffic messages is intended to include any form of transmission, including direct wireless transmission.)

Vehicles 302 and non-vehicles 314 in the region 102 have appropriate equipment for receiving the traffic messages 306 and advertising messages 308. In one embodiment, installed in some of the vehicles 302 are a navigation system 402 that can receive and use the traffic and advertising messages 306, 308. As shown in FIG. 6, the navigation system 402 is a combination of hardware and software components. In one embodiment, the navigation system 402 includes a processor 404, a drive 406 connected to the processor 404, and a non-volatile memory storage device 408 for storing navigation application software programs 410 and possibly other information. The processor 404 may be of any type used in navigation systems.

The navigation system 402 may also include a positioning system 412. The positioning system 412 may utilize GPS-type technology, a dead reckoning-type system, or combinations of these or other systems, all of which are known in the art. The positioning system 412 may include suitable sensing devices that measure the traveling distance speed, direction, and so on, of the vehicle. The positioning system 412 may also include appropriate technology to obtain a GPS signal, in a manner that is known in the art. The positioning system 412 outputs a signal to the processor 404. The navigation application software program 410 that is run on the processor 404 may use the signal from the positioning system 412 to determine the location, direction, speed, etc., of the vehicle 302.

Referring to FIG. 6, the vehicle 302 includes a traffic message receiver 414. The receiver 414 may be a satellite radio or FM receiver tuned to the appropriate frequency used by the traffic broadcast information system 304 to broadcast the traffic messages 306 and advertising messages 308. The receiver 414 receives the traffic and advertising messages 306, 308 from the traffic information provider 310. (In an alternative in which the traffic messages are sent by a direct wireless transmission, such as via a cellular wireless transmission, the receiver 414 in the vehicle 106 may be similar or identical to a cellular telephone.) The receiver 414 provides an output to the processor 404 so that appropriate programming in the navigation system 402 can utilize the traffic and advertising messages 306, 308 broadcast by the traffic broadcast system 304 when performing navigation functions, as described more fully below.

The navigation system 402 also includes a user interface 416 that allows the end user (e.g., the driver or passengers) to input information into the navigation system. This input information may include a request to use the navigation features of the navigation system 402, which uses the geographic database 200 stored on a storage medium 420. In this embodiment, the storage medium 420 is installed in the drive 406 so that the geographic database 200 can be read and used by the navigation system 402. In one embodiment, the geographic data 200 may be a geographic database published by NAVTEQ® of Chicago, Ill. The storage medium 420 and the geographic database 200 do not have to be physically provided at the location of the navigation system 402. In alternative embodiments, the storage medium 420, upon which some or all of the geographic data 200 are stored, may be located remotely from the rest of the navigation system 402 and portions of the geographic data provided via a communications link, as needed.

In one exemplary type of system, the navigation application software program 410 is loaded from the non-volatile memory 408 into a RAM 422 associated with the processor 404 in order to operate the navigation system 402. The processor 404 also receives input from the user interface 416. The input may include a request for navigation information. The navigation system 402 uses the geographic database 200 stored on the storage medium 420, possibly in conjunction with the outputs from the positioning system 412 and the receiver 414, to provide various navigation features and functions. The navigation application software programs 410 may include separate applications (or subprograms) that provide these various navigation features and functions. These functions and features may include route calculation 424 (wherein a route to a destination identified by the end-user is determined), route guidance 426 (wherein detailed directions are provided for reaching a desired destination), map display 428, and vehicle positioning 430 (e.g., map matching).

Also included in the navigation programs 410 on the navigation system 402 is a location referencing programming 432. The location referencing programming 432 facilitates using data contained in the traffic messages 306 when performing navigation functions. A method for providing this feature is disclosed in U.S. Pat. No. 6,438,561, entitled "METHOD AND SYSTEM FOR USING REAL-TIME TRAFFIC BROADCASTS WITH NAVIGATION SYSTEMS," the entire disclosure of which is incorporated by reference herein. U.S. Pat. No. 6,438,561 discloses a method and system in which location reference codes used in traffic messages 306 are related to geographic data used by the navigation system 402 thereby enabling it to use the information contained in traffic message broadcasts. Using data from broadcast traffic messages 306 together with the geographic database 200 allow the navigation system 402 to provide route calculation that considers up-to-the-minute traffic and road conditions when determining a route to a desired destination.

Moreover, the navigation programs 410 also include an advertising referencing programming 434, which provides advertisements to the end user of the navigation system 402 using data contained in the traffic messages 306 and the advertising messages 308. According to one embodiment, the advertising referencing programming 434 assesses advertisements that are stored in the storage medium 420 through data being transmitted from the traffic information provider 310. In particular, the messages 306, 308 contain a reference of the advertisements, the advertising referencing programming 434 matches the reference from the messages to the advertisements stored in the storage medium 420. For a specific embodiment, the messages 306, 308 may include several advertising references that are customized according to locations. In this case, the advertisements are provided based upon the advertising reference and the location reference.

Although other embodiments of national and regional advertisements are not required to be linked to any specific locations, the location reference is, nevertheless, useful since the traffic messages may be structured according to local geographic areas. One way of resolving this, the advertising references can simply be assigned to all of the location references. In an alternative embodiment, separate location reference can be designated to different portion of the geographic area, such as country, state, county, city, zip code, or the like. For example, a national advertisement can simply be associated with a location reference designating the United States.

In another alternative embodiment, the location reference can be dropped from the messages altogether. For one embodiment, the message includes the advertising reference code that substantially uniquely identify advertisement(s) or a portion of an advertisement that is stored in a advertisement database, which may be separate or part of the geographic database 200 (shown in FIG. 4). The advertisement database, in turn, is stored on the navigation system. When the message having the advertisement reference code is received at the navigation system, the advertisement is displayed to the end user using the advertisement reference code and the advertisement database. In another embodiment, the advertisement reference code may be resource codes representing at least a portion of an advertisement. This message with the resource code, which is the actual advertisement, can be serially transmitted for broadcast via the traffic channel. In this embodiment, a location reference again not necessarily. With both embodiments, the radio station may define the broadcast area that the traffic messages would be broadcasted.

In another embodiment, advertisements may be transmitted directly from the traffic information provider 310 to the navigation system 402, and in this case, the advertising referencing programming 434 simply outputs the data. Furthermore, multiple types of location references are contemplated. In one embodiment, the location reference can be related to location reference code of the traffic message or the protocols of the traffic channels. Moreover, location references are not limited to geographic locations, such as road segments. According to another embodiment, the location references can also refer to a point of interest on the road segment. Still yet another embodiment, the location references can refer to local data located on a geographic location, such as individual shops or facilities within a shopping mall, a building structure, or a school campus. The invention relating to the local data (e.g., shops or facilities) of a geographic database is detailed in U.S. Pat. No. 7,660,666, which is herein incorporated, in whole or part, by reference. These and other various advertising reference programming 434 implementations are readily appreciated by one skilled in the art, they are, thus, within the scope of the various teachings described.

Other functions and programming 436 may be included in the navigation system 402. The navigation application program 410 may be written in a suitable computer programming language such as C, although other programming languages, such as C++ or Java, are also suitable. All of the components described above may be conventional (or other than conventional) and the manufacture and use of these components are known to those of skill in the art.

III. System for Developing Traffic Messages

A. General Overview

The traffic information broadcast system 304 provides for collecting of data indicating traffic and road conditions and paid advertisements, developing traffic and advertising messages 306, 308 from the collected data, and transmitting the messages to the vehicles 302 and non-vehicles 314 in the region 102 on a regular and continuing basis. The traffic information broadcast system 304 includes the central facility 400 that develops such traffic and advertising messages 306, 308. The central facility 400 includes suitable equipment and programming 400(2), 400(3) for developing the traffic and advertising messages 306, 308 as illustrated in FIG. 3. The suitable equipment and programming 400(2), 400(3) for developing the traffic and advertising messages 306, 308 is a combination of hardware and software components. In one embodiment shown in FIG. 7, the central facility 400 includes a computing platform 500, such as a personal computer, having a processor 502, RAM 504, user interface 506, communication system 508, and non-volatile storage device 510 for storing a traffic program 512 that develops the traffic and advertising messages 306, 308. An operator may use the user interface 506 to manually enter and edit traffic information. The central facility 400 also includes a geographic database 514 containing geographic data representing the road network 12 of the geographic region 10 and advertisements associated to the road network. The geographic database 514, in contrast to database 200 which is used for navigation-related application, is used for the providing traffic and advertising message. As such, the geographic database 514 may be similar or different from geographic database 200. The geographic database 514 may also contain portions of the geographic database 200. In one embodiment, the geographic database 514 may contain the geographic data published by NAVTEQ of Chicago, Ill.

Figure 7:
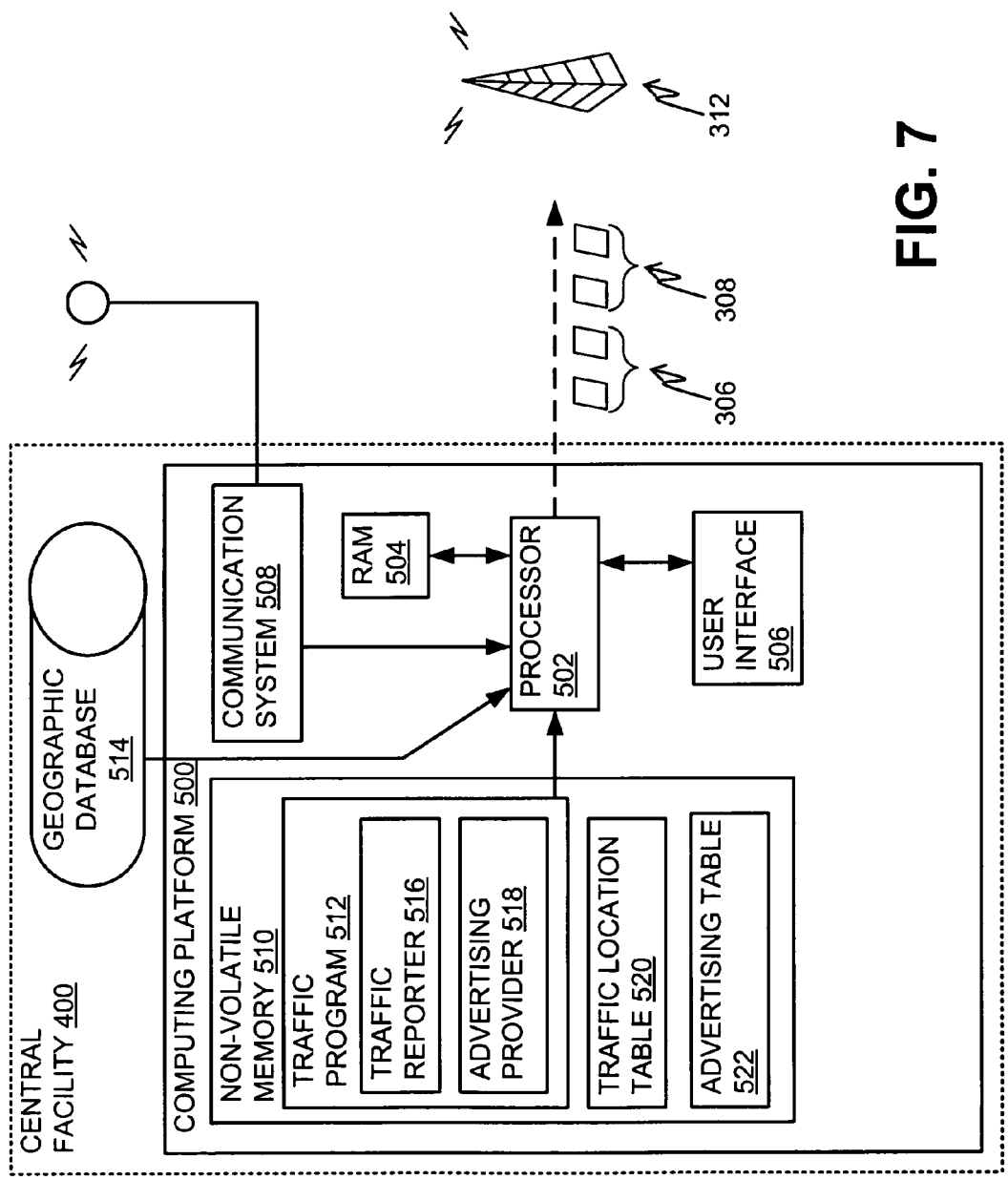
FIG. 7 is a block diagram illustrating the components of a central facility of the traffic broadcast system as shown in FIGS. 5 and 6.

In particular, the traffic program 512 includes a traffic reporter 516 and an advertising provider 518, which work in junction with a traffic location table 520 and an advertising table 522 to provide the traffic information and advertisements. Although the advertising provider 518 has been shown to be integrated as part of the traffic program 512, the advertising provider 518 can also be an independent component from the traffic reporter. Moreover, a specific data structure of a table is shown in FIG. 7 for implementing the data of the traffic location and advertising data, but other data structures are also possible, which is readily appreciated by a skilled artisan. In fact, as well known in the art, the type of data structure used greatly depends upon the configuration of the database design. And since the various embodiments described are not platform-specific, these other data structures are within the scope of the various teachings shown and described.

B. Data Format

Figure 8:
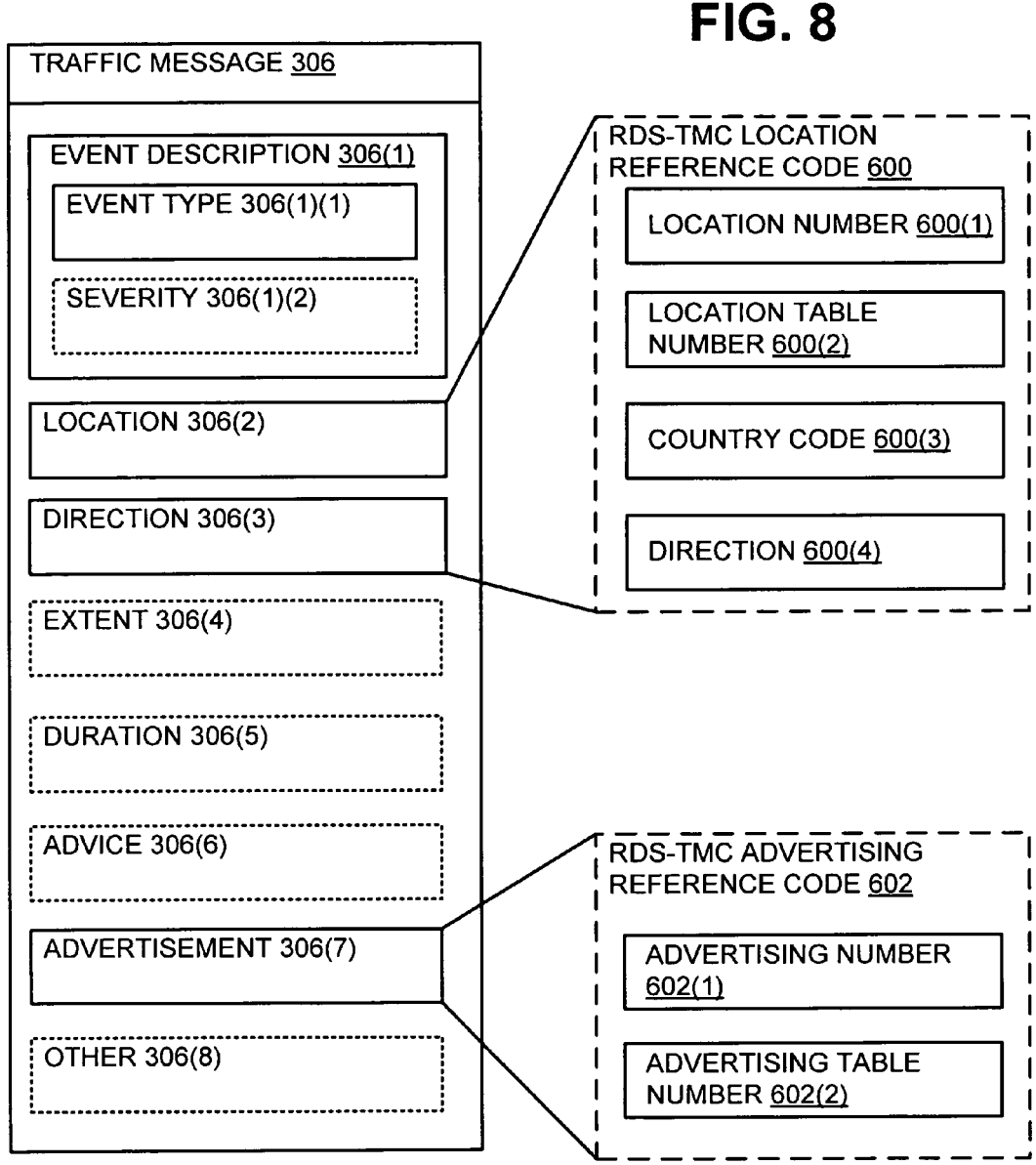
FIG. 8 is a diagram illustrating data components included in one of the traffic messages according to various embodiments.

The central facility 400 may provide the traffic messages 306 in a variety of different formats for transmission by different broadcasters and for use with different end users. FIG. 8 illustrates one example of the data components of a traffic message 306. For brevity, the following data formats shown comply with the ALERT-C protocol, although other data formats are contemplated and within the scope of the various teachings. The traffic message 306 includes the following data components: an event description 306(1), a location 306(2), a direction 306(3), an extent 306(4), duration 306(5), advice 306(6), and advertisement 306(7). In alternative embodiments, the traffic message 306 may also include components that provide other information 306(8).

The event description component 306(1) may include data that describe a traffic event type 306(1)(1), such as a traffic condition along with data that describe a level of severity 306(1)(2) of the event type. By convention, the location portion 306(2) of the traffic message 306 specifies the location at which a traffic queue begins. This location may be referred to as the primary location or the head. The traffic message 306 also indicates a secondary location or tail. The traffic message 306 indicates the secondary location indirectly, i.e., by means of the direction and extent 306(4). The extent 306(4) indicates how many location codes from the primary location are affected at the level of severity (i.e., 306(1)(2)) indicated in the traffic message 306. The direction component 306(3) includes data that indicate the direction of traffic affected. The duration component 306(5) provides an expected amount of time that the traffic condition will likely exist. The advice component 306(6) provides a recommendation for a diversion of route. The advertisement component 306(7) provides advertisements using the traffic channel, either as a part of the traffic message 306 or a separate advertising message 308.

According to one embodiment, the traffic message 306 conforms to the standard format for ALERT-C messages established in the RDS-TMC system. For example, in the RDS TMC system, the event description 306(1), including description 306(1)(1) and severity 306(1)(2), is an ALERT-C event code, and the duration 306(5) is an ALERT-C duration code. In the RDS TMC system, the location 306(2) portion of the message 306 includes a RDS TMC location reference code 600. The RDS TMC location reference code 600 includes a location number 600(1), a location table number 600(2), a country code 600 (3), and a direction 600(4). The location number 600(1) is a unique number within a region to which one location table (i.e., a database of numbers) corresponds. The location table number 600(2) is a unique number assigned to each separate location table. The country code 600(3) is a number that identifies the country in which the location referenced by the location number 600(1) is located. The direction 600(4) takes into account bi-directionality.

In this embodiment of an ALERT-C message, the advertising component 306(7) similarly includes a RDS TMC advertising reference code 602 having an advertising number 602(1) and an advertising table number 602(2). The advertising number 602(1) is a substantially unique number for identifying one or more advertisements or a portion of an advertisement to be provided to the user, which may be stored in the geographic database 200 according to one embodiment. The advertising table number 602(2) is a substantially unique number assigned to each separate advertising table. Through this protocol of the traffic message 306, advertisements can be seamlessly incorporated into the existing traffic messages. Moreover, in the embodiment shown in FIG. 8, advertising data are integrated into the traffic messages 306. Thus, as part of the traffic reporting, traffic data and advertising data are simultaneously provided to end users of the navigation system.

Although the advertising number 602(1) shown as a practical embodiment, the advertising reference code 602 may include, in an alternative embodiment, resource codes representing the advertisements or at least a portion of the advertisement if the bandwidth can accommodate the transmission of the message. As such, the advertising reference code 602 may include resource codes representing at least a portion of an advertisement or a substantially unique code identifying at least a portion of an advertisement stored on a recipient device of the traffic message. Furthermore, since other data formats are contemplated depending on the traffic system, the terms "location reference code" and "advertising reference code" include other message protocols other than the ALERT-C protocol. Thus, these terms include other message protocol for performing similar functions relating to the location reference code and the advertising reference code.

Figure 9:
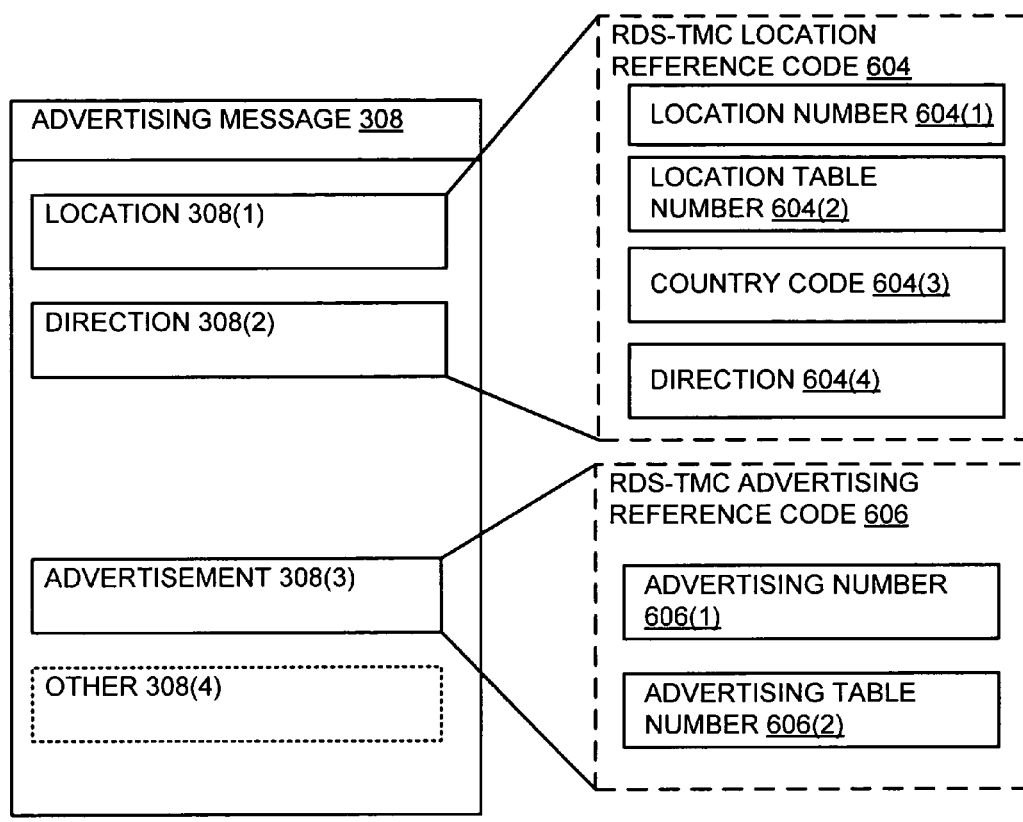
FIG. 9 is a diagram illustrating data components included in one of the advertising messages according to various embodiments.

Turning to an alternative embodiment shown in FIG. 9, the advertising message 308 is sent as a separate message from the traffic message 306. In this embodiment, the advertising message is periodically and/or selectively sent through the RDS TMC system. Since the ALERT-C protocol is location-specific, a location component 308(1) and a direction component 308(2) are included to provide location-specific advertising data. Moreover, one of the advantages of using the location component 308(1) and the direction component 308(2) is that the advertisements can be customized according to specific locations, while providing a seamless integration into the ALERT-C protocol structure. An advertisement component 308(3) is further included to provide the needed advertising data. In the advertising message 308, components that provide other information 306(4) may also be included.

Specific to the RDS TMC system, a RDS-TMC location reference code 604 is also included in the advertising message 308. Similar location number 604(1), location table number 604(2), country code 604(3), and direction 604(4) are included in the RDS-TMC location reference code 604. The advertisement component 308(3) also includes its own RDS-TMC advertising reference code 606, which also includes an advertising number 606(1) and an advertising table number 606(2). Again, if the bandwidth can accommodate the transmission of the advertisements, the advertising reference code 606 can include resource codes representing the advertisement, instead of a substantially unique code identifying the advertisement stored on a recipient device of the traffic message.

As shown, the central facility 400 may format the traffic and advertising data into traffic and advertising messages 306, 308 that correspond to the ALERT-C messages established in the RDS-TMC system. Additionally, different traffic and advertising message formats are possible. These formats include, but are not limited, to Alert-C protocol, Alert-Plus protocol, packet-based protocol, and VICS message protocol. Since the appropriate message format depends greatly upon the communication system, any format that can be implemented to any type of communication system is contemplated. Specifically, some of the current available communications contemplated include, but again are not limited to, Radio Data System (RDS), Traffic Message Channel (TMC), Radio Data System-Traffic Message Channel (RDS-TMC), Vehicle Information and Communication System (VICS), digital radio, satellite radio, mobile Internet, mobile paging, and General Packet Radio Services/Global System for Mobile (GPRS/GSM) phone networks.

C. Assignment of the Location Reference Number

Figure 10:
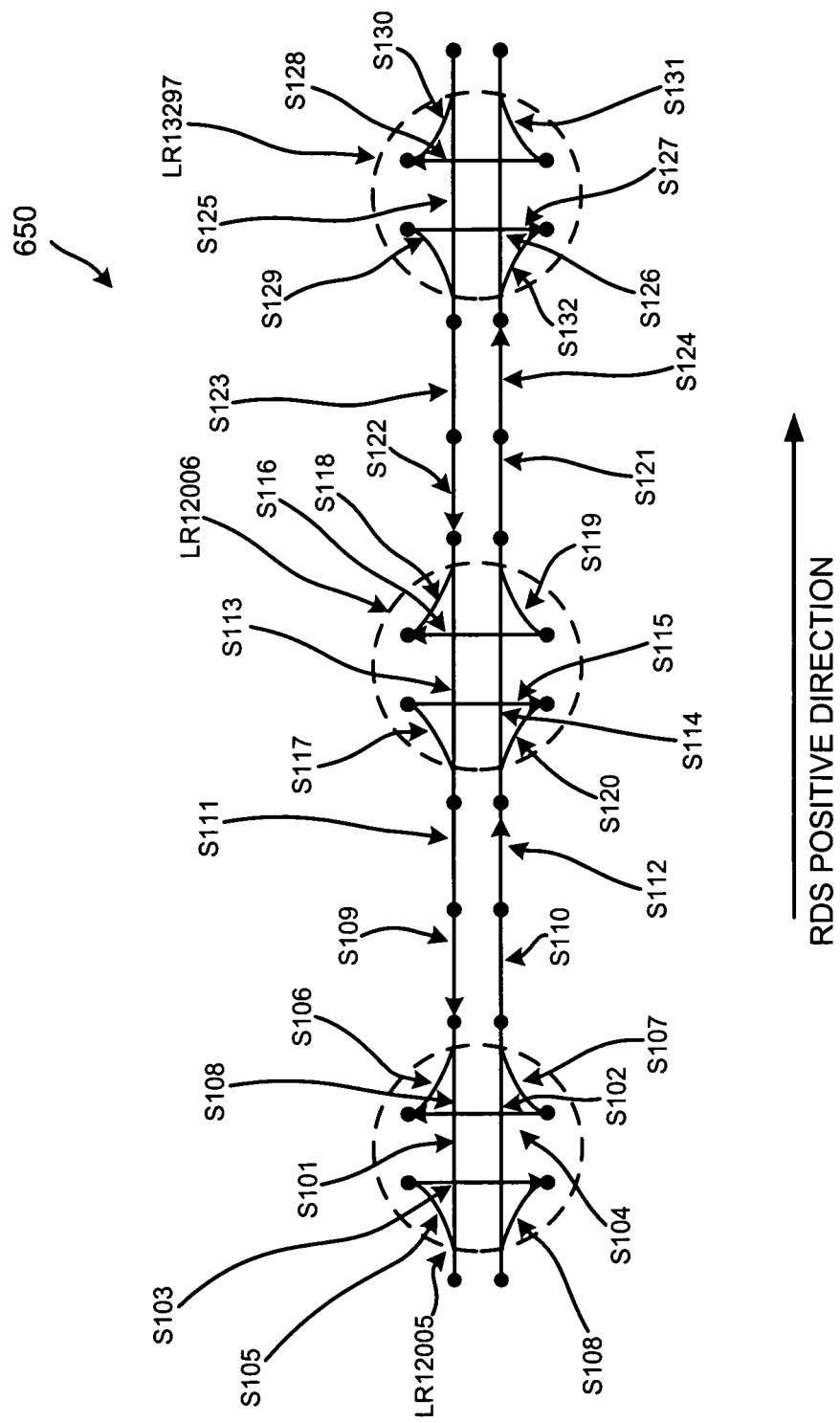
FIG. 10 is an illustration of a portion of a roadway along which intersections have been assigned location reference numbers which are used by the traffic broadcast system of FIG. 5.

FIG. 10 shows one example of how location reference numbers are assigned. Specifically, FIG. 10 illustrates a portion of a roadway 650, which represents multiple road segments in the road network 108 (FIG. 1) that the traffic information broadcast system 304 monitors and reports traffic congestion by means of traffic messages 306.

In order to identify locations along the roadway 650 at which traffic congestion occurs, location reference numbers (e.g., LR12005, LR12006, and LR13297) are pre-assigned to locations along the roadway. These location reference numbers are assigned by the road authorities or others involved with the traffic information broadcast system 304. The traffic messages 306 broadcast by the traffic information broadcast system 304 include these location reference numbers when identifying locations of traffic congestion.

In traffic information broadcast systems, such as the RDS-TMC system, the roadway 650 being monitored and about which traffic messages are broadcast is usually an expressway or major arterial road. Traffic conditions along minor roads may not be monitored by these kinds of traffic broadcast systems. Accordingly, in traffic information broadcast systems, such as the RDS-TMC system, location reference numbers are assigned to locations along expressways and major arterial roads, but not along minor roads.

FIG. 10 shows only three location numbers, LR12005, LR12006, and LR13297. It is understood that in a typical traffic information broadcast system, there may be hundreds, thousands, or more, of location reference numbers assigned to locations along roads in each region represented by a location table. As shown in FIG. 10, the location reference numbers correspond to interchanges along the roadway 650. However, location reference numbers may be assigned to any position along the roadway 650, including positions between interchanges.

In traffic broadcast systems, such the RDS-TMC system, directions may be defined as positive or negative. For example, in the RDS-TMC system, the direction is positive for travel directions west to east and from south to north. The location reference numbers may be, but are not necessarily, assigned in consecutive order along a road segment.

In traffic information broadcast systems, such as the RDS-TMC system, each roadway 650 is assigned its own location reference numbers. The location reference numbers of one roadway 650 are not shared with other roadways. Therefore, at an interchange between two roadways each of which is assigned a location reference number, one location reference number is assigned to the interchange for the first of the roadways 650 and a second different location reference number is assigned to the same interchange for the second of the roadways. Thus, a single interchange may have two or more location reference numbers assigned to it, one for each of the roadways that meet at the interchange.

As mentioned above, one of the difficulties associated with using the location reference numbers with a navigation system that uses a geographic database is that the location reference numbers do not necessarily relate to any physical roadway features. As illustrated in FIG. 10, the roadway 650 is shown to consist of individual road segments, labeled S101, S102, . . . S132. These road segments S101, S102, . . . S132, correspond to individual portions (i.e., segments) of the roadway 650. For example, each of these individual segments of the roadway 650 may comprise a portion of the roadway between intersections of the roadway with other roads, including on-ramps and off-ramps. In the geographic database 200 (FIG. 2), each of these separate road segments, S101, S102, . . . S132, is represented by at least one separate data record.

In the road segment shown in FIG. 10, there are separate road segments associated with the lanes of the roadway 650 for each direction. This represents a typical expressway configuration in which the lanes going in one direction are physically separate from the lanes going in the other direction. Where the lanes are actually physically separate from each other, such as in the portion of the roadway 650 depicted in FIG. 10, there may be separate segment data records in the geographic database 200 for the lanes in one direction and the lanes in the other direction. Even where the lanes of the roadway 650 are not physically separated from each other, they may be represented by separate data records in the geographic database. Alternatively, a single segment data record may be included in the database that represents all the lanes of the roadway 650 in both directions. The database records include attributes that indicate whether they represent lanes in both directions or only lanes in a single direction.

As illustrated in FIG. 10, there may be multiple segments, S101, S102, . . . S132, of the roadway 650 associated with each location along the roadway to which a location reference number (e.g., LR12005, LR12006 . . . ) has been assigned. As stated above, each of these multiple segments of the roadway 650 may be represented by at least one record in the geographic database 200. Moreover, as illustrated by FIG. 10, there may also be several segments of the roadway 650 located between the interchanges along the roadway 650 to which location reference numbers have been assigned. Each of these segments of the roadway 650 between interchanges may be represented by at least one record in the geographic database 200. However, none of these individual road segments S101, S102 . . . , S132, is separately identified as relating to the location reference numbers by the traffic broadcast system in the messages that are broadcast.

As mentioned above, it would be advantageous if the data in the traffic messages 306 could be utilized when calculating a route using the route calculation function 424 in the navigation system 402 (FIG. 6). If the data in the traffic messages could be used by the navigation system, the segments associated with traffic congested locations that are assigned location reference numbers could be avoided by the route calculation function. Unfortunately, as exemplified by FIG. 10, the location numbers assigned by the traffic broadcast system authorities do not directly relate to any physical feature represented by the data records in the geographic database 200. Moreover, the traffic messages broadcast by the traffic information broadcast system 304 do not necessarily relate to any of the actual road segments that are represented by data records in the geographic database.

Still another factor that complicates using the traffic messages broadcast by a traffic broadcast system in a route calculation function in a navigation system is that, in systems such as the RDS-TMC system, the length of the roadway affected by an occurrence of traffic congestion is reported in terms of the "extent" data 306(4) which is included in the broadcast traffic message, as mentioned above in connection with FIG. 8. The "extent" data are defined in terms of the number of adjacent positions represented by location numbers that are affected by the traffic congestion condition relative to the position along the roadway identified by the location reference number in the traffic message. Thus, the "extent" data 360(4) also do not bear any direct relationship with physical features represented by data records in the geographic database. Using "extent" data in traffic messages compounds the difficulty of incorporating traffic information broadcast message information in the route calculation function 424 of the navigation system 402.

In order to use the traffic message data to support a route calculation function, a way is required that relates the location reference data from a traffic message to the geographic data (such as the segment data records) in the geographic database used by the route calculation function. In a route calculation function, such as the function 424 shown in FIG. 6, route calculation may be performed by exploring multiple potential solution routes from a starting location to a destination location. The route calculation function 424 may perform this process by comparing multiple possible paths from intersections along parts of potential solution routes and selecting the path that has the best overall cost, based upon some cost assignment criteria. To compare these potential solution routes, or parts thereof, the data records that represent each road segment in these potential solution routes are examined. These data records include information from which a comparison of the potential solution routes can be made. For example, the data records that represent road segments may include attributes that indicate the speed limit along the represented road segment, whether there is a stop light at the end of the road segment, and so on. Using these data, the potential solution routes can compared to each other so that the best solution route (e.g., the route with the fastest overall travel time or the least overall distance) can be selected.

It can be appreciated that the data in the traffic messages 306 broadcast by the traffic broadcast system, such as the data that identify areas of traffic congestion, may be pertinent to the calculation of the best overall route. In order to incorporate the information in the traffic data messages into the route calculation function, it is required to identify the data records that represent the road segments that are associated with the interchanges, including those road segments that lead into the interchanges, for which location reference numbers have been assigned by the traffic information broadcast system 304. To provide this function, present embodiments include combinations of features and/or components that allow a navigation application program 410 in the navigation system 402 to use the data in the traffic messages 306. A more detail description of the location keys of the traffic message is disclosed in U.S. Pat. No. 6,438,561 issued to Israni et al., owned by NAVTEQ, which is incorporated, in whole and/or in part, by reference.

IV. Advertisement Applications

The processes shown are specific implantations of the components shown in the operating paradigm shown in FIG. 6. Other implementations of each of the processes shown, however, may be better suited for other components of the system, specifically such as the central facility 400 and the navigation system 302. Since the appropriate processes greatly depend upon the configuration and the resources of the system, other implementations that may not be specifically described are readily appreciated by one skilled in the art. Moreover, these processes shown can further be implemented fully or partially at any of the components within the system shown in FIG. 6. As one skilled in the art can readily appreciate, any of the processes shown can be altered in multiple ways to achieve the same functions and results of the various teachings described. As a result, these processes shown are one exemplary embodiment of multiple variation embodiments that may not be specifically shown. Thus, the processes shown are directed to the system, and each of them may be altered slightly to accommodate any of the components in the navigation network. These other embodiments, however, are within the scope of the various teachings described.

A. Central Facility Advertising Applications

Figure 11:
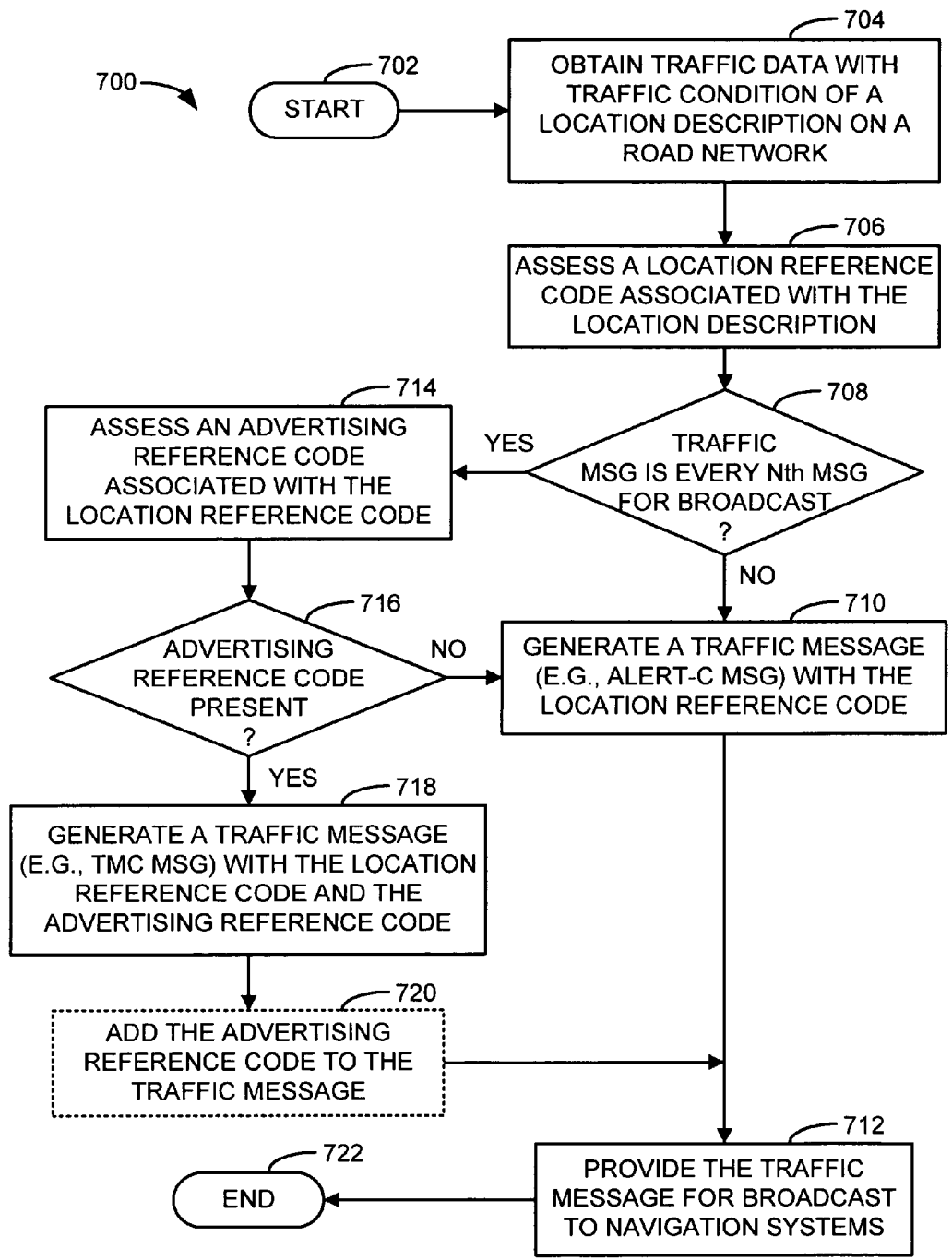
FIG. 11 is a flow chart diagram of a traffic message process according to various embodiments.

Turning now to FIG. 11, a flow diagram of a traffic message process implemented at the central facility 400 is shown according to various embodiments and indicated generally at 700. The traffic message process 700 starts 702 by obtaining 704 traffic data with traffic condition of a location description on a road network. Once the traffic data is obtained 704, a location reference code associated with the location description is assessed 706, followed by a determination 708 as to whether the traffic messages is a message of every Nth message for broadcast, such that N is greater than zero.

This determination 708 may be optionally implemented for breaking up the amount of advertisements so that they are not intrusive to the end user. Depending upon the configuration of the traffic system and the traffic conditions, the appropriate Nth message that is the least intrusive may vary. For example, the Nth message may be 50 during heavy condition since the vehicle is traveling at a much slower speed, resulting in a more static change of locations. As another example, if the vehicle is traveling faster speed, producing a faster change of locations, the Nth message may be set to 10, whereas on the other extreme, advertisements are included every $100^{th}$ message when the vehicle is at a complete stop. Other embodiments of the Nth message being ranges for different conditions are also contemplated. For example, advertisements are provided every $10^{th}$ to $25^{th}$ message when the location of the vehicle is changing more rapidly, while advertisements are provided every $50^{th}$ to $65^{th}$ message when the location of the vehicle is changing slowly or every $100^{th}$ to $150^{th}$ message when the vehicle is in a complete stop. These various embodiments are contemplated and they are within the scope of the various teachings.

Turning back to FIG. 11, if the traffic message is, in fact, the Nth message, a traffic message (e.g., ALERT-C message) with the location reference code is generated 710 and provided 712 for broadcast to the navigation systems. If, on the other hand, the traffic message is the Nth message, an advertising reference code associated with the location reference code is assessed 714. A determination 716 is made as to whether the advertising reference code is, in fact, present, and if not, the traffic message with the location reference code is generated 710 and provided 712 for broadcast to the navigation systems.

According to this embodiment shown, the advertising reference code is not created if there is no advertisement associated with the location reference code. Other alternative embodiments, such as including an advertising reference code designated to empty advertisement may also be implemented. Specifically, for this embodiment shown, the advertisements would be sold according to the location reference code. For example, a local franchise McDonald may only be interested in advertising in one or more locations that are within two miles radius of the local franchise McDonald. In this case, the local franchise advertiser is free to choose different locations based on the local description of the road segments. Depending upon the territories that the local franchise advertiser picked, the advertising rate is based on the location reference code of the territories. Moreover, since locations may have different traffic and marketing values, some location reference code may cost more than other. As a result, the use of location reference code being referenced to various advertising rates can offer more customized and flexible rates that can accommodate large national advertiser as well as small local merchants.

Referring back to FIG. 11, when the advertising reference code is present 716 (e.g., advertisements exists for this location reference code), a traffic message having the location reference code and the advertising reference code is generated 718 and provided 712 for broadcast to the navigation systems, according to one embodiment. In alternative embodiment, the advertising reference code may be added 720 to the traffic message previously generated with the location reference code. Accordingly, these traffic messages, either with or without the advertising reference code, are provided 712 for broadcast to navigation systems, and the process ends 722 once these traffic messages are provided for broadcast.

Figure 12:
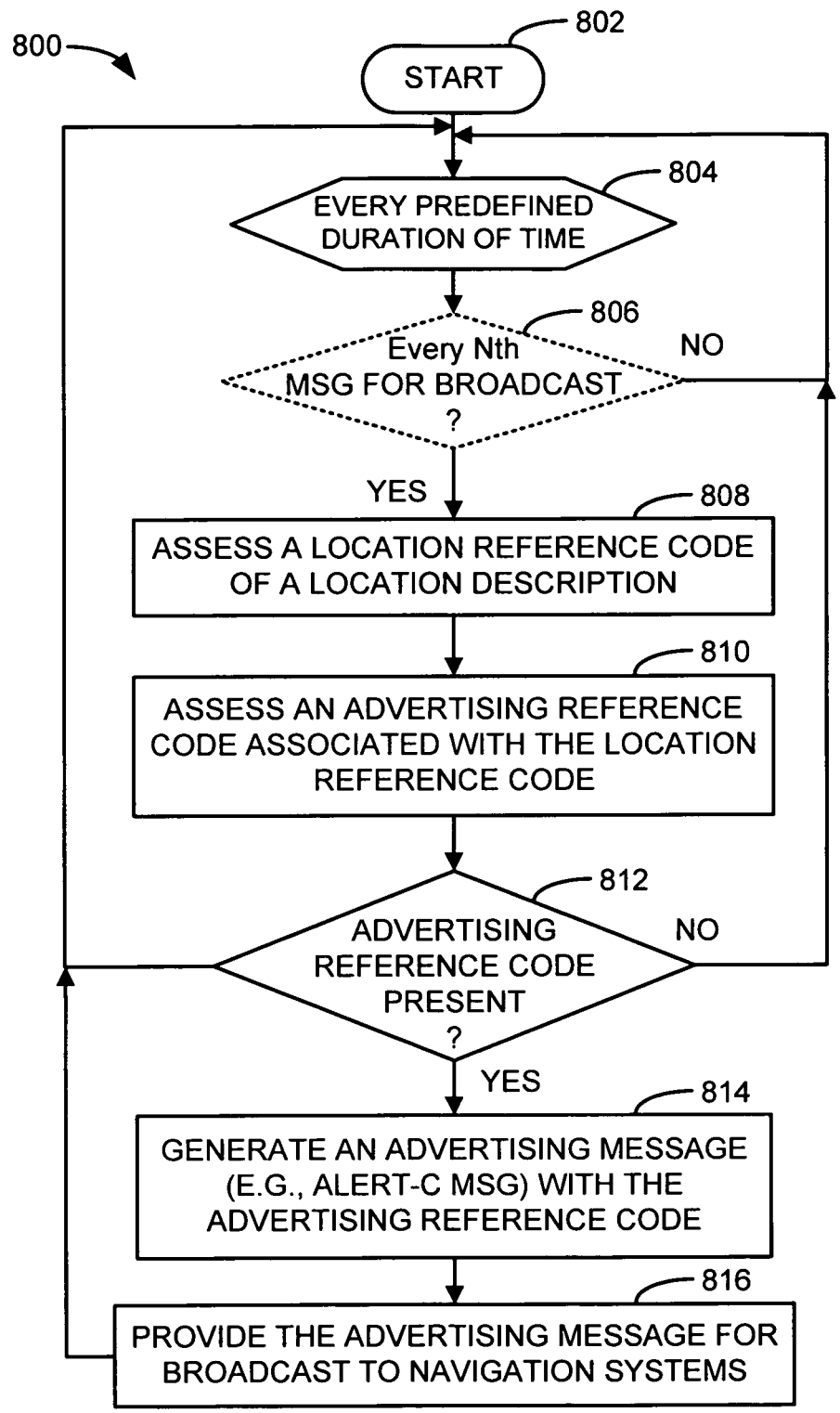
FIG. 12 is a flow chart diagram of an advertising message process according to various embodiments.

Referring now to FIG. 12, a flow diagram of an advertising message process implemented at the central facility 400 is shown according to various embodiments and indicated generally at 800. According to one embodiment, the advertising message process 800 starts 802 every predefined duration of time 804. The filter of every predefined duration for the advertising messages may be optionally included to lessen the intrusion to the end user. Moreover, another optional filter of every Nth message for broadcast 806 may also be used or a combination of these two filters can also be used to ensure that the end user is not bombarded with endless advertisements. After passing the filtering processes 804, 806, a location reference code of a location description and an advertising reference code associated with the location reference code are assessed 808, 810, and a determination is made 812 as to whether the advertising reference code is, in fact, present. If not 812, the process 800 loops back to wait for every predefined duration of time 804. If, however, the advertising reference code is, in fact, present, an advertising message (e.g., ALERT-C message) having the advertising reference code is generated 814 and provided 816 for broadcast to navigation systems. After which, the process 800 loops back and starts over to wait 804 for the next reiteration.

B. Navigation System Advertising Applications

Figure 13:
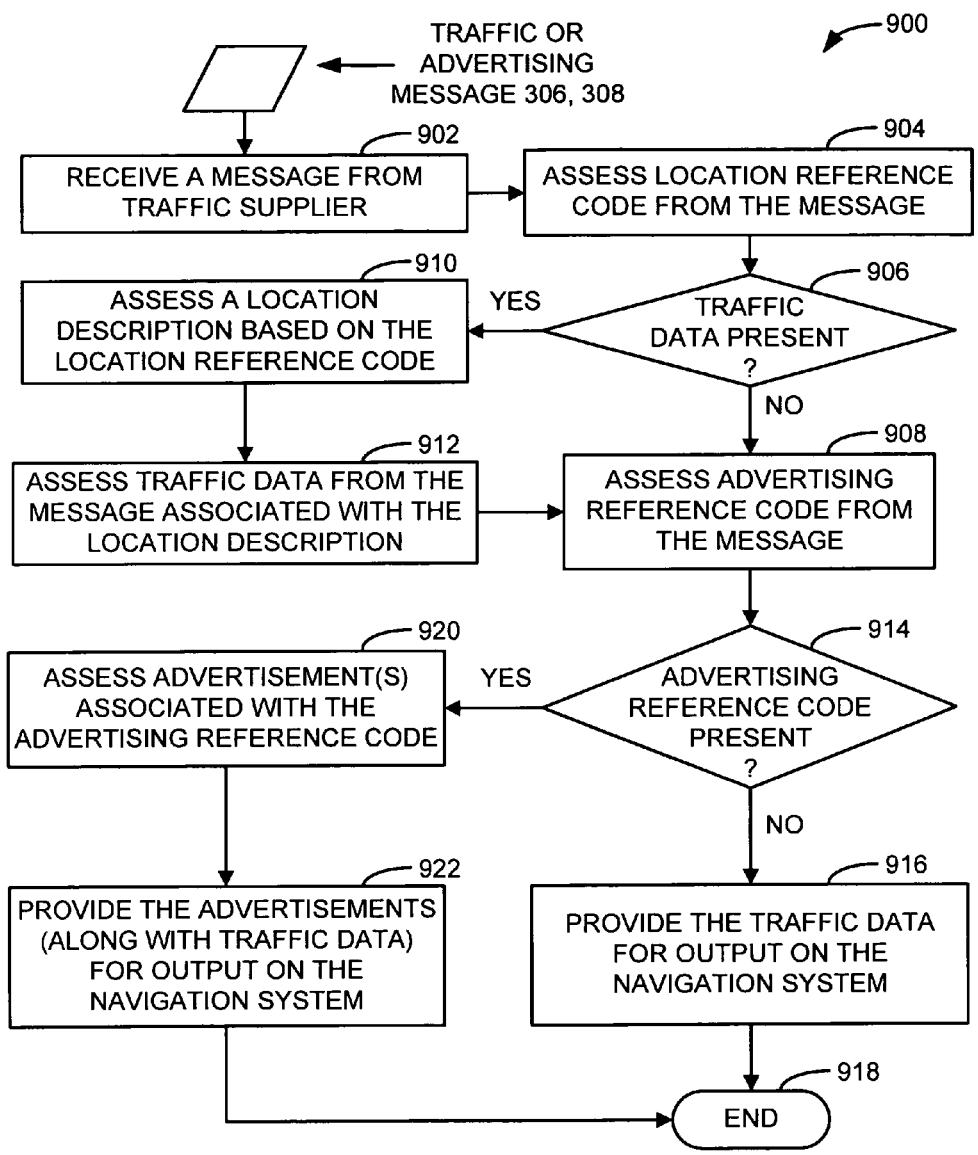
FIG. 13 is a flow chart diagram of a navigation message process according to various embodiments.

FIG. 13 shows a flow diagram of a navigation message process implemented at the navigation system 402 according to various embodiments and indicated generally at 900. The navigation message process 900, upon receipt 902 of a message from the traffic supplier, a location reference code is assessed 904 from the message. Since these various embodiments described provide a traffic message with or without advertisements and an advertising message without traffic information, a determination 906 is made as to whether traffic data is, in fact, present in the message. If not, the advertising reference code is assessed 908 from the message. When the traffic data is present, a location description based the location reference code and traffic data associated with the location description are assessed 910, 912 from the message, followed by an assessment 908 of the advertising reference code. It is then determined 914 whether the advertising reference code is present, and if not, the traffic data is provided 916 for output on the navigation systems. The process ends 918 at this point. If, on the other hand, the advertising reference code is, in fact, present in the message, any advertisements associated with the advertising reference code is assessed 920 and provided 922 along with any available traffic data for output on the navigation systems, which ends 918 the process.

Through the embodiments of various teachings, an advertising technique using the traffic services have been provided that, among other thing, seamlessly integrates into the existing traffic service systems. Moreover, advertisements can be customized according to geographical area using the location reference code of the traffic message. Since an advertising reference code is provided, minimal data transmission is needed, reducing the resource cost of the transmission. A monthly service may be eliminated in place of advertisements for the dynamic traffic reporting.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A computer-implemented method for a traffic information broadcast system to provide advertisements in a traffic message comprising:
   obtaining at a processor in the traffic information broadcast system traffic data having a traffic condition of a location description on a road network;
   assessing by the processor a location reference code associated with the location description, the location reference code is pre-assigned prior to operation of the traffic information broadcast system;
   assessing by the processor an advertising reference code associated with the location reference code;
   wherein the location reference code and the advertising reference code are associated with an advertisement message having a data size larger than the data size of the location reference code and advertising reference code;
   generating by the processor a traffic message having the location reference code and the advertising reference code instead of the advertisement message, the data size of the traffic message being less than if the advertisement message were included therein; and
   automatically broadcasting the traffic message in a traffic channel such that a device in receipt of the traffic message may present the advertisement message, not included in the traffic message, to a user thereof based on the location reference code and the advertising reference code.

2. The method according to claim 1 is implemented at server side of a traffic service network.

3. The method according to claim 1 further comprising:
   generating a traffic message having the location reference code when the advertising reference code is not present.

4. The method according to claim 1 further comprising:
providing the traffic message for broadcast to navigation systems.

5. The method according to claim 4, wherein the traffic message is broadcast using anyone or more selected from a group of Radio Data System (RDS), Traffic Message Channel (TMC), Radio Data System-Traffic Message Channel (RDS-TMC), Vehicle Information and Communication System, digital radio, satellite radio, mobile Internet, mobile paging, and General Packet Radio Services/Global System for Mobile (GPRS/GSM) phone networks.

6. The method according to claim 1 further comprising, prior to assessing an advertising reference code associated with the location reference code:
determining whether the traffic message is a message of every predefined number of messages for broadcast; and
generating a traffic message having the location reference code when the traffic message is a message of every predefined number of messages for broadcast.

7. The method according to claim 6, wherein the predefined number of messages is based, at least in part, on anyone or more selected from a group of a predefined time duration, every $10^{th}$ message, every $50^{th}$ message, every $100^{th}$ message, a range of every $10^{th}$ to $25^{th}$ message, a range of every $50^{th}$ to $65^{th}$ message, and a range of every $100^{th}$ to $150^{th}$ message.

8. The method according to claim 1, wherein the traffic message uses anyone or more selected from a group of an Alert-C protocol, Alert-Plus protocol, packet-based protocol, and Vehicle Information and Communication System message protocol.

9. The method according to claim 1, wherein the location reference code comprises anyone or more selected from a group of a geographic location, a point of interest, a local location of a geographic location.

10. The method according to claim 1, wherein the advertising reference code comprises anyone or more selected from a group of resource codes representing at least a portion of an advertisement and a substantially unique code identifying at least a portion of an advertisement stored on a recipient device of the traffic message.

11. The method according to claim 1, wherein assessing an advertising reference code associated with the location reference code further comprises:
assessing a current time;
assessing the advertising reference code based, at least in part, on the current time.

12. A computer-implemented method for a traffic information broadcast system to provide advertisement messages using location reference codes comprising:
assessing by a processor in the traffic information broadcast system a location reference code pre-assigned to a location having a traffic condition of a location description on a road network, where the location reference code is pre-assigned prior to operation of the traffic information broadcast system;
assessing by the processor an advertising reference code associated with the location reference code wherein the location reference code and the advertising reference code are associated with an advertisement message having a data size larger than the data size of the location reference code and advertising reference code;
generating by the processor a traffic message having the location reference code and the advertising reference code instead of the associated advertisement message, the data size of the traffic message being less than if the associated advertisement message were included therein; and
providing, by the processor, the traffic message for broadcast to navigation systems without receiving a request from the navigation systems such that a navigation system in receipt of the traffic message may present the associated advertisement message, not included in the traffic message, to a user thereof based on the location reference code and the advertising reference code.

13. The method according to claim 12 is implemented at server side of a traffic service network.

14. The method according to claim 12, wherein the traffic messages are sent every predefined number of messages for broadcast.

15. The method according to claim 14, wherein the predefined number of messages is based, at least in part, on anyone or more selected from a group of a predefined time duration, every $10^{th}$ message, every $50^{th}$ message, every $100^{th}$ message, a range of every $10^{th}$ to $25^{th}$ message, a range of every $50^{th}$ to $65^{th}$ message, and a range of every $100^{th}$ to $150^{th}$ message.

16. The method according to claim 12, wherein the traffic message is broadcast using anyone or more selected from a group of Radio Data System (RDS), Traffic Message Channel (TMC), Radio Data System-Traffic Message Channel (RDS-TMC), Vehicle Information and Communication System, digital radio, satellite radio, mobile Internet, mobile paging, and General Packet Radio Services/Global System for Mobile (GPRS/GSM) phone networks.

17. The method according to claim 12, wherein the traffic message uses anyone or more selected from a group of an Alert-C protocol, Alert-Plus protocol, packet-based protocol, and Vehicle Information and Communication System message protocol.

18. The method according to claim 12, wherein the location reference code comprises anyone or more selected from a group of a geographic location, a point of interest, a local location of a geographic location.

19. The method according to claim 12, wherein the advertising reference code comprises anyone or more selected from a group of resource codes representing at least a portion of an advertisement and a substantially unique code identifying at least a portion of an advertisement stored on a recipient device of the advertising message.

20. The method according to claim 12, wherein assessing an advertising reference code associated with the location reference code further comprises:
assessing a current time;
assessing the advertising reference code based, at least in part, on the current time.

21. A computer-implemented method for a navigation system to obtain advertisements from a traffic information broadcast system comprising:
automatically receiving a message broadcasted by the traffic information broadcast system, the message contains a location reference code pre-assigned to a location on a road network and an advertising reference code associated with the location reference code, the location reference code is pre-assigned prior to operation of the traffic information broadcast system, the location reference code and the advertising code being associated with at least one advertisement not included in the message and having a data size larger than the data size of the location reference code and advertising reference code, the data size of the message being less than if the at least one advertisement were included therein;

assessing by the processor in the navigation system at least one advertisement not included in the received message associated with the advertising reference code; and presenting by the processor the at least one advertisement to a user of the navigation system at a location based on the location reference code.

22. The method according to claim 21 is implemented at client side of a traffic service network.

23. The method according to claim 21 further comprising:
determining whether traffic data is present from message;
assessing a location description based, at least in part, on the location reference code;
assessing traffic data from the message associated with the location description; and
presenting the at least one advertisement along with the traffic data advertisement to a user of the navigation system.

24. The method according to claim 21, wherein the at least one advertisement is anyone or more selected from a group of an audio output, an video output, an icon output, and a text output.

25. The method according to claim 21, wherein the message is broadcast using anyone or more selected from a group of Radio Data System (RDS), Traffic Message Channel (TMC), Radio Data System-Traffic Message Channel (RDS-TMC), Vehicle Information and Communication System, digital radio, satellite radio, mobile Internet, mobile paging, and General Packet Radio Services/Global System for Mobile (GPRS/GSM) phone networks.

26. The method according to claim 21, wherein the message uses anyone or more selected from a group of an Alert-C protocol, Alert-Plus protocol, packet-based protocol, and Vehicle Information and Communication System message protocol.

27. The method according to claim 21, wherein the location reference code comprises anyone or more selected from a group of a geographic location, a point of interest, a local location of a geographic location.

28. The method according to claim 21, wherein the advertising reference code comprises anyone or more selected from a group of resource codes representing at least a portion of an advertisement and a substantially unique code identifying at least a portion of an advertisement stored on a recipient device of the traffic message.

* * * * *